UNITED STATES PATENT OFFICE.

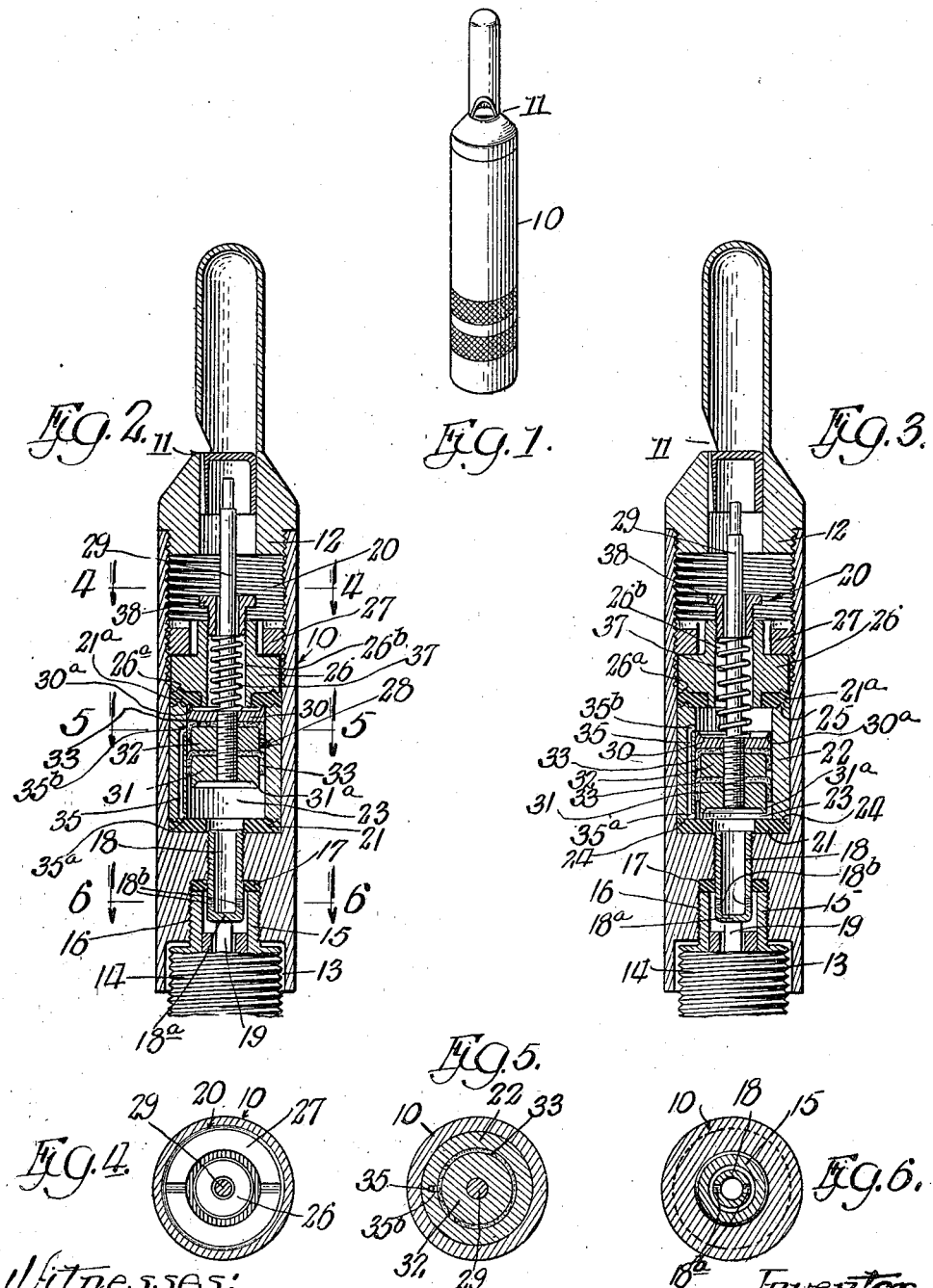

LEWIS E. HAWK, OF CHICAGO, ILLINOIS, ASSIGNOR OF ONE-THIRD TO EARL R. KILPATRICK, OF CHICAGO, ILLINOIS.

PNEUMATIC-TIRE-ALARM DEVICE.

1,230,071.  Specification of Letters Patent.  Patented June 12, 1917.

Application filed May 17, 1915. Serial No. 28,614.

*To all whom it may concern:*

Be it known that I, LEWIS E. HAWK, a citizen of the United States, and a resident of Chicago, in the county of Cook and State of Illinois, have invented certain new and useful Improvements in Pneumatic-Tire-Alarm Devices; and I do hereby declare that the following is a full, clear, and exact description thereof, reference being had to the accompanying drawings, and to the letters of reference marked thereon, which form a part of this specification.

This invention relates to improvements in pneumatic tire alarm devices and consists of the matters hereinafter described and more particularly pointed out in the appended claims.

One of the objects of the invention is to produce a tire alarm device of simple and economical construction and of neat, attractive appearance which may be easily attached to the threaded nipple of a pneumatic tire valve. Another object of the invention is to provide a device of the kind described which, while comprising few parts, is efficient in operation, so that the driver of the machine, to the tire of which the device is applied, will always be instantly informed of the condition of the tire whether that condition be either total or partial deflation.

These and other objects of my invention and its various advantages in use will appear more clearly as I proceed with my specification.

In the drawings:

Figure 1 is a view in perspective of a pneumatic tire alarm device made in accordance with my invention.

Fig. 2 is a view on an enlarged scale representing a vertical central section through my improved tire alarm when applied to the inlet valve of a pneumatic tire.

Fig. 3 is a view similar to Fig. 2 illustrating the parts in changed position.

Figs. 4, 5 and 6 are views representing transverse horizontal sections through my improved tire alarm device, the planes of the sections being indicated by the lines 4—4, 5—5 and 6—6 respectively of Fig. 2.

Referring now to that embodiment of my invention illustrated in the drawings:—10 indicates a tubular casing which constitutes the main body of my improved device and which contains the valve mechanism that controls the sounding of the alarm. In the particular device illustrated, an ordinary whistle 11 of familiar type is used for sounding the alarm, said whistle being attached to one end of the tubular body 10. The whistle 11 has a reduced threaded end 12 which is engaged by an internal thread at the top of the tubular body 10. The lower end of the body has a recess 13 of substantially the same diameter as the tubular opening at the upper end of the body which is adapted to receive the nipple 14 of the tire inlet valve. The reduced threaded end 15 of the said nipple, to which the familiar closing cap is usually applied, is threaded into a smaller recess 16 located above the recess 13. An annular gasket 17 at the top of this recess is engaged by the end of the nipple when the device as a whole is properly secured to the valve, thus providing a gas-tight connection between the alarm device and the inlet valve.

Above the recess 16 is a threaded passageway which connects the main chamber of the body with the aforesaid recesses at its bottom end. A tubular stem 18 is threaded through this passage and has a closed bottom end 18ª for engagement with the valve stem 19 of the tire valve. Thus when the alarm device is screwed home upon the valve nipple, the said valve stem 19 is depressed, thus opening the inlet valve to permit the escape of the air or other fluid in the tire to the alarm device.

The tube 18 has diametrically opposite ports 18ᵇ near its bottom end. Said tube is of somewhat smaller diameter than the inner diameter of the valve nipple, thus providing an annular space about said tube through which the fluid, air, or the like, is allowed to pass from the valve nipple 14 into and through the tube 18.

The part of the body 10 above the upper end of the tube 18 contains a cylindrical chamber 20. In the bottom of said chamber and surrounding the upper end of the opening or passage in which the tube 18 is fixed, is placed an annular gasket 21. 22 indicates a tubular shell or sleeve which fits snugly within the tubular body 10 and immediately incloses the piston valve chamber 23.

The sleeve 22 is provided with a sharp annular rib 24 at the bottom, which is embedded or buried in the gasket 21. Said sleeve has a similar sharp annular rib 25 at its upper end which is embedded in an annular gasket 21ª that forms the top wall of the valve chamber. The gaskets 21 and 21ª and the sleeve 22 are held rigidly in place by means of a thimble 26 that bears on the upper gasket and is held rigidly engaged thereon by a jam nut 27 threaded into the upper end of the tubular body. The thimble 26 is provided on its bottom surface with an annular V-shaped groove or notch 26ª which is located in vertical alinement with the rib 25 at the upper end of the sleeve 22 and acts to provide room for the distortion of the gasket by the said rib.

28 indicates the piston valve plug and 29 indicates its stem. The valve plug 28 is made of a plurality of parts and as shown in the drawings, comprises a larger disk 30 and two slightly smaller disks 31, 32. The disk 30 which is the top disk, is made to fit snugly within the valve chamber 23 and is provided on top and at its outer periphery with an annular knife-edge 30ª which seats in the bottom of the gasket 21ª. There are interposed between the top disks 30 and 32 and between the intermediate and bottom disks 31 and 32 respectively, washers 33, 33, which are of sufficient diameter to project beyond the periphery of the disks and down between the said disks and the wall of the valve chamber. It is important that these washers should make an absolutely close airtight seal between the piston valve and the valve chamber wall and I have found that the best material for these washers is rawhide. Said washers are necessarily made comparatively thin and the oil contained in the rawhide is retained for an almost indefinite period so that the washer does not dry out in use. In addition, the rawhide is very flexible as compared to a leather washer and acts to completely fill the space between the periphery of the valve plug and the wall of the valve chamber without unnecessary resistance to the movement of the piston valve plug.

The valve stem is threaded through the three metal parts 30, 31, 32 which compose the main body of the valve and this construction provides easy means for securely clamping the metal parts upon the washers engaged between them. The bottom disk 31 is provided at its peripheral edge with a knife-edge 31ª to seat in the gasket 21 on the bottom wall of the valve chamber.

In the sleeve 22 there is provided at one side a longitudinal passage 35 which opens laterally by a port 35ª into the bottom end of the valve chamber and by a port 35ᵇ into said chamber at a point near the upper end thereof. This passageway is of sufficient length to span the valve plug so that when said valve plug has been depressed to bring its upper end below the top port 35ᵇ the passageway 35 will provide communication between the bottom of the valve chamber and the part of the said chamber above said valve plug.

The thimble 26 is provided with a vertical aperture 26ᵇ through which the valve stem 29 extends. Said aperture is of larger diameter than the valve stem and contains an expansion coiled spring 37 which surrounds said valve stem. The said spring abuts at its bottom end against the top of the valve plug and at its top end against an apertured nut 38 which is threaded into the top end of the aperture in the thimble and through which the valve stem passes loosely. The aperture in the nut is sufficiently larger than the valve stem so as to provide a free air passage about the valve stem.

The operation of the device is as follows: The parts are normally in the position indicated in Fig. 2, with the top end of the valve plug 28 held closed against the top gasket 21ª by the pressure in the tire, since the space in the valve chamber below the valve plug is connected directly through the tube 18 and the ports 18ª with the pressure fluid in said tire. The coiled spring 37 is under tension. Upon any substantial diminishing of pressure in the tire whether caused by sudden blow-out or by a slow leak or for some other reason, the spring will act to depress the valve plug into the position shown in Fig. 3. As will be manifest, the tension of the spring may be so adjusted by means of the nut 38 as to properly predetermine the pressure within the tire at which this will occur. When the valve plug is depressed so that its top end is below the port 35ᵇ of the passage 35, the said passage spans the valve plug, and communication is opened between the top and bottom ends of the valve chamber. The pressure fluid from the tire flows into the top of the valve chamber and escapes thence through the tubular opening or aperture 26ᵇ in the thimble 26 and up through the aperture in the nut 38 and so to the whistle upon which it produces a blast so as to sound it. This blast continues until the pressure in the tire has been so reduced as to permit the spring to close the valve plug down upon the bottom gasket 21. The knife-edge rib 31ª at the bottom of the valve plug embeds itself in said gasket and cuts off further supply of fluid to the whistle, thus preventing the continuous annoying wheeze of the whistle after the attention of the driver has been called to the tire.

It will be noted that the knife-edge rib at the top of the valve plug is of the same diameter as the greatest diameter of the valve plug, so that the knife-edge rib incloses a space equal to the pressure area of the valve plug. This prevents any possibility of the fluid by leakage exerting any pressure on the top end of the valve plug, thus adding its pressure to the spring pressure and making the device operate before there is any necessity for its operation. The washers 33 likewise fully close the space between the periphery of the bottom members of the valve plug and the peripheral wall of the valve chamber and further prevent the escape of the pressure fluid above the valve plug.

It is apparent from the foregoing description that my improved alarm device may also be used as a pressure gage for use when inflating a pneumatic tire and its operation as such in connection with an ordinary 32″ by 3½″ tire as an example, is as follows:

The maximum pressure in such a tire is about 60 lbs. When my improved alarm device is applied to the tire and the pressure therein is 60 lbs., this pressure will hold the piston valve in a position to close off the port 35. The spring 37 is of such strength as to move the valve downwardly to open the port at a pressure substantially below 60 lbs. and thus when inflating the tire, if the pressure is not at a maximum, an audible sound will be produced by the whistle. The party inflating the tire will then know that the pressure therein is not a maximum pressure and further inflation is required. Upon further inflation the valve is again applied, and if a whistling sound is not apparent, the operator will then know that the tire is properly inflated to its maximum pressure.

I claim as my invention:

1. In an alarm device of the kind described, a casing adapted for attachment to the inlet valve of a pneumatic tire, means providing a piston valve chamber in said casing, a spring controlled piston valve plug movable in said chamber, the wall of said chamber being provided with a passageway adapted to span the piston valve when the same is depressed beyond a certain point, and a gasket of elastic compressible material forming the top wall of said valve chamber, said piston valve plug being provided with a knife-edge annular rib of a diameter equal to the pressure area of said valve plug.

2. In a device of the kind described, a casing adapted for attachment to the inlet valve of a pneumatic tire, said casing being provided with a chamber, means providing a piston valve chamber within said casing chamber, and a spring controlled piston valve plug movable in said piston valve chamber, said valve chamber comprising a ported tubular sleeve, having annular ribs at its top and bottom ends, elastic compressible gaskets in said casing chamber, one at each end of said tubular sleeve, a thimble having an annular groove in its bottom surface engaging the topmost gasket, said annular groove being located in vertical alinement with the ribs on said tubular sleeve, and means engaging said thimble for causing compression of said gaskets against the ribbed ends of said tubular sleeve and the grooved bottom surface of said thimble.

3. In a device of the kind described, a casing adapted for attachment to the inlet valve of a pneumatic tire, means providing a piston valve chamber in said casing, gaskets of elastic compressible material forming the top and bottom walls of said chamber, a spring controlled piston valve plug movable in said chamber, said valve plug comprising a plurality of disks mounted upon a valve stem, the topmost disk being provided with a knife-edge annular rib of a diameter equal the diameter of said pressure chamber, the other disks being of a smaller diameter and the bottommost disk being provided with an annular knife-edge rib, and flexible washers interposed between said disks, said washers projecting beyond the periphery of the bottommost disks and down between said disks and the wall of said pressure chamber, the annular knife-edge rib on said piston disks being adapted to seat in said elastic compressible gaskets, when said piston valve is at either limit of movement in said pressure chamber.

In testimony, that I, claim the foregoing as my invention I affix my signature, in the presence of two witnesses, this 7th day of May, A. D. 1915.

LEWIS E. HAWK.

Witnesses:
   T. H. ALFREDS,
   KARL W. DOLL.

Copies of this patent may be obtained for five cents each, by addressing the "Commissioner of Patents, Washington, D. C."